United States Patent
Ishizuka (10) Patent No.: US 7,208,882 B2
(45) Date of Patent: Apr. 24, 2007

(54) LIGHTING DEVICE FOR DISCHARGE LAMP

(75) Inventor: Akio Ishizuka, Yokohama (JP)

(73) Assignee: Harison Toshiba Lighting Corporation, Ehime (JP)

( * ) Notice: Subject to any disclaimer, the term of this patent is extended or adjusted under 35 U.S.C. 154(b) by 35 days.

(21) Appl. No.: 11/137,466

(22) Filed: May 26, 2005

(65) Prior Publication Data

US 2005/0264237 A1    Dec. 1, 2005

(30) Foreign Application Priority Data

May 28, 2004  (JP)  ............... 2004-159010
Apr. 1, 2005  (JP)  ............... 2005-106257

(51) Int. Cl.
  *H05B 37/02*  (2006.01)
  *H05B 41/16*  (2006.01)
(52) U.S. Cl. ............. 315/225; 315/226; 315/276; 315/291
(58) Field of Classification Search ............ 315/209 R, 315/224, 226, 246, 276, 282, 283, 287, 291, 315/307, 308, 309

See application file for complete search history.

(56) References Cited

U.S. PATENT DOCUMENTS

| 5,434,474 | A | * | 7/1995 | Ukita et al. | ............. 315/128 |
| 5,498,933 | A | * | 3/1996 | Nakamura | ............. 315/205 |
| 5,608,294 | A |   | 3/1997 | Derra et al. | ............ 315/224 |
| 6,815,910 | B2 | * | 11/2004 | Suzuki et al. | ............ 315/291 |

FOREIGN PATENT DOCUMENTS

JP    10-501919    2/1998

* cited by examiner

*Primary Examiner*—Thuy Vinh Tran
(74) *Attorney, Agent, or Firm*—DLA Piper US LLP (57) ABSTRACT

A lighting device for high-pressure discharge lamp for lighting the high-pressure discharge lamp by lowering or raising a DC voltage applied to an input side by a DC/DC converter circuit, then converting the DC power into an AC power by a DC/AC inverter circuit, supplying the AC power to the high-pressure discharge lamp and lighting the high-pressure discharge lamp, wherein when the polarity of the current of the high-pressure discharge lamp lit by the substantially rectangular wave is inverted, the output voltage of the DC/DC converter circuit is set to 1.5 times or more as large as the voltage at the stable lighting time of the high-pressure discharge lamp.

7 Claims, 9 Drawing Sheets

LIGHTING DEVICE FOR DISCHARGE LAMP

CROSS-REFERENCE TO RELATED APPLICATIONS

The present invention contains subject matter related to Japanese Patent Application JP 2004-159010 filed on May 28, 2004, and Japanese Patent Application JP 2005-106257 filed on Apr. 1, 2005, in the Japanese Patent Office, the entire contents of which being incorporated herein by reference.

BACKGROUND OF THE INVENTION

1. Field of the Invention

The present invention relates to a lighting device for high-pressure discharge lamp used to light a headlight for an automobile.

2. Description of the Related Art

A conventional lighting device for high-pressure discharge lamp is connected at its input side of a voltage supply source for generating a DC current to a power source for supplying a voltage, and connected at its output side of the voltage supply source to a commutator for converting a DC current into an AC current, and lights the high-pressure discharge lamp connected to the output side by an AC lamp current. Also, a means for generating a current pulse at each half period of the lamp current is connected to the voltage supply source (for example, Japanese Patent Application Laid-Open Publication No. 10-501919).

BRIEF SUMMARY OF THE INVENTION

In a conventional lighting device for lighting a high-pressure discharge lamp by an AC lamp current, it is difficult to take a temperature balance of electrodes due to the presence of a polarity inversion of the lamp current, and stability of discharge is low. Thus, an origin of an arc discharge on a surface of the electrode has moved, and a blinking phenomenon called a flicker has occurred. This blinking phenomenon is particularly observed remarkably in a high-pressure discharge lamp used for a headlight of an automobile. This is caused by a special lighting type for supplying about twice as large as a power immediately after lighting with respect to the power at the stable lighting time.

In connection with this problem, in the lighting device for high-pressure discharge lamp of the above-mentioned patent reference, the stability of the discharge is increased by superposing the current pulse of the same polarity as that of the lamp current on the lamp current at the rear half portion of the lamp current by a means for generating the current pulse connected to the voltage supply source, and thereby intends to suppress the generation of flicker.

However, in the lighting method of the above-mentioned patent reference, in the case on the premise that the discharge lamp is lit by a constant power, since the pulse-like current is added, in proportion to the amount of the pulse-like current the lamp current must be lowered to lit the lamp in the other time zone. Accordingly, the discharge is hardly stabilized so that flicker occurs.

Further, when a high-pressure discharge lamp in which mercury is not sealed is lit, a power applying time at an initial time of lighting is longer than the high-pressure discharge lamp in which the mercury is sealed. Since a large current flows to the high-pressure discharge lamp in which the mercury is not sealed during the period of the power applying time, electrodes are designed to be thick so as not to deform or dissolve the electrodes during this period of time. Therefore, the method for superposing the lamp current in the lighting of the high-pressure discharge lamp in which the mercury is not sealed, is further hardly stabilized in the discharging except the time when the lamp current is superposed, and is said to be a means for easily generating flicker.

An object of the present invention is to provide a lighting device for high-pressure discharge lamp which suppresses the generation of flicker.

According to one aspect of the present invention, there is provided a lighting device for high-pressure discharge lamp for lighting the high-pressure discharge lamp by lowering or raising a DC voltage applied to an input side by a DC/DC converter circuit, then converting the DC power into an AC power by a DC/AC inverter circuit, supplying the AC power to the high-pressure discharge lamp and lighting the high-pressure discharge lamp, wherein when the polarity of the current of the high-pressure discharge lamp lit by the substantially rectangular wave is inverted, the output voltage of the DC/DC converter circuit is set to 1.5 times or more as large as the voltage at the stable lighting time of the high-pressure discharge lamp.

According to the present invention, the generation of flicker of the discharge lamp can be suppressed.

DETAILED DESCRIPTION OF THE INVENTION

The lighting device for high-pressure discharge lamp according to the embodiments of the present invention will be described with reference to the accompanying drawings.

(First Embodiment)

Figure 1:
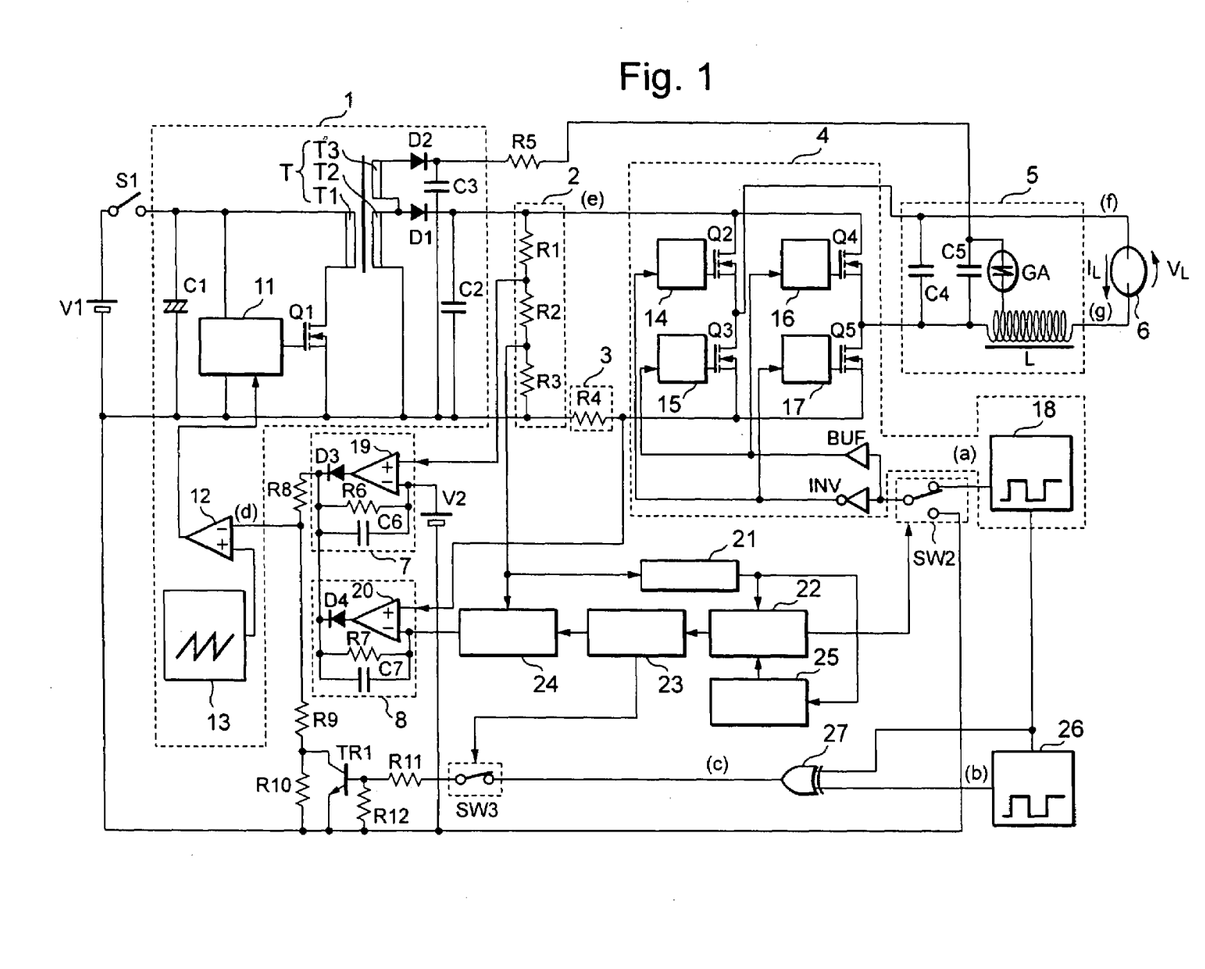
FIG. 1 is a circuit configuration diagram of a lighting device for high-pressure discharge lamp according to a first embodiment of the present invention.

FIG. 1 shows a circuit configuration of the lighting device for high-pressure discharge lamp according to the first embodiment of the present invention.

The lighting device comprises a DC power source V1, a switch S1, a DC/DC converter circuit 1, an output voltage detecting circuit 2, an output current detecting circuit 3, a DC/AC inverter circuit 4, an igniter 5, a high-pressure discharge lamp 6 and a control circuit for controlling these.

In the DC/DC converter circuit 1, a primary side of a transformer T includes a capacitor C1, a switching element Q1, a power MOS drive circuit 11, a PWM comparator 12, a sawtooth-like wave generating circuit 13, and a transformer T1. A secondary side of the transformer T connected to the DC/AC inverter circuit 4 includes a transformer T2, a diode D1 and a capacitor C2, and a secondary side of the transformer T connected to the igniter 5 includes a transformer T3, a diode D2 and a capacitor C3.

A connecting relationship of the transformer T1 of the primary side of the transformer T will be described. For example, the switching element Q1 including a MOSFET is connected in series with the DC power source V1, the switch S1 and the transformer T1, and the power MOS drive circuit 11 is connected to the gate thereof. The PWM comparator 12 is connected to the power MOS drive circuit 11, and the sawtooth-like wave generating circuit 13 is connected to the non-inverting input terminal thereof. The capacitor C1 is connected in parallel with the DC power source V1 through the switch S1.

A connecting relationship of the transformers T2, T3 of the secondary side of the transformer T connected to the DC/AC inverter circuit 4 will be described. The transformer T2 is connected in series with the diode D1, and the capacitor C2 is connected in parallel with the transformer T2 through the diode D1.

A connecting relationship of the secondary side of the transformer T connected to the igniter 5 will be described. The transformer T3 is connected in series with a mid-point of the transformer T2 and the diode D1 and with the diode D2 to construct an output to the igniter 5. The capacitor C3 is connected in parallel with the transformer T3 through the diode D2.

The output voltage detecting circuit 2 includes resistors R1, R2 and R3 connected in series and, this circuit is connected in parallel with the capacitor C2 at the output side from the capacitor C2.

The output current detecting circuit 3 includes a resistor R4, and is connected between the output voltage detecting circuit 2 and the DC/AC inverter circuit 4, and is also connected to their low-voltage sides, respectively.

The DC/AC inverter circuit 4 includes, for example, switching elements Q2 to Q5 each having a MOSFET, drive circuits 14 to 17, a rectangular low frequency generating circuit 18, a buffer BUF, and an inverter INV.

In the connecting relationship, the switching elements Q2 and Q3, and the switching elements Q4 and Q5 are respectively connected in series, forming a so-called full-bridge circuit configuration. Further, output terminals of the DC/AC inverter circuit 4 are respectively provided from the connecting points of the switching elements Q2 and Q3, and the switching elements Q4 and Q5. The drive circuits 14 to 17 are respectively connected to the gates of the switching elements Q2 to Q5. The drive circuits 15 and 16 are connected to the rectangular low frequency generating circuit 18 through the buffer BUF and further through a switch SW2 to be described later, and the drive circuits 14, 17 are connected to the rectangular low frequency generating circuit 18 through the inverter INV and further through the switch SW2.

The igniter 5 includes capacitors C4, C5, a pulse transformer L, and a gas arrester GA. The capacitor C4 is connected in parallel with both ends of the output terminals of the DC/AC inverter circuit 4. The capacitor C5 is connected in series with the output terminal of the transformer T3 through a resistor R5. The pulse transformer L is connected in series with one of the outputs of the DC/AC inverter circuit 4. To the pulse transformer L, the gas arrester GA connected in parallel with the capacitor C5 is connected.

The high-pressure discharge lamp 6 is a lamp which does not contain mercury in a discharge space, but instead evaporates a metallic halide and a rare gas to emit a light, and is connected to the output terminals of the DC/AC inverter circuit 4 through the pulse transformer L of the igniter 5.

As a structure of the control circuit for controlling the switching element Q1 of the DC/DC converter circuit 1, a differential amplifying circuit 7, a reference voltage V2, a resistor R8, a lighting detecting circuit 21, a lighting time counting timer 22, a target power value setting circuit 23, a dividing circuit 24, a lights-out time counting timer 25, a switch SW2, a differential amplifying circuit 8, a delay circuit 26, a logical circuit 27, a switch SW3, a switching element Q6, and resistors R9 to R12 are used.

The differential amplifying circuit 7 includes an OP amplifier 19, a diode D3, a resistor R6, and a capacitor C6. A voltage detecting point between the resistor R1 and the resistors R2, R3 of the input voltage detecting circuit 2 is connected to a non-inverting input terminal of an input of the OP amplifier 19, the reference voltage V2 is connected to an inverting input terminal of the OP amplifier 19, and the diode D3 is connected in series with an output terminal of the OP amplifier 19. Also, the resistor R6 and the capacitor C6 are connected in parallel with a series connection of the OP amplifier 19 and the diode D3. Further, an output terminal of the differential amplifying circuit 7 is connected to an inverting input terminal of the PWM comparator 12 through the resistor R8.

The differential amplifying circuit 8 includes an OP amplifier 20, a diode D4, a resistor R7, and a capacitor C7, and the connecting relationship is the same as that of the differential amplifying circuit 7. A voltage detecting point between the resistor R4 of the input current detecting circuit 3 and the DC/AC inverter circuit 4 is connected to a non-inverting input terminal of an input of the OP amplifier 20, and a dividing circuit 24 is connected to an inverting input terminal of the OP amplifier 20.

The dividing circuit 24 is connected to a voltage detecting point between the resistors R1, R2 and the resistor R3 of the input voltage detecting circuit 2, and to the target power value setting circuit 23 through the voltage detecting point between the resistors R1, R2 and the resistor R3, the lighting detecting circuit 21, and the lighting time counting timer 22. Also, to the lighting time counting timer 22, the lighting detecting circuit 21 is connected through the lights-out time counting timer 25. Also, to the lighting time counting timer. 22 and the target power value setting circuit 23, switches SW2, SW3 which are switched or opened or closed after a predetermined time when receiving inputs, are respectively connected. Further, the output terminal of the differential amplifying circuit 8 is connected to an inverting input terminal of the PWM comparator 12 through the resistor R8.

Also, to the non-inverting input terminal of the PWM comparator 12, a transistor TR1 connected at a collector between the resistors R9 and R10 and disposed in parallel with the resistor R10, is connected. To a base of the transistor TR1, the logical circuit 27 which combines output waveforms of the rectangular low frequency generating circuit 18 and the delay circuit 26 and outputs the combined output waveform, the switch SW3 and the resistor R11, are connected.

Next, a circuit operation of this embodiment will be described. When the switch S1 is closed, for example, a voltage is generated in the capacitor C1 by the DC power source V1 of a battery for an automobile of ten and several V to several tens of V. This capacitor C1 performs an operation of suppressing an infinitesimal voltage change due to a change of an output current of the DC power source.

When a voltage is generated in this capacitor C1, though not shown, a voltage is supplied to the OP amplifier 19. A voltage of the non-inverting input terminal at this time is zero, and since the reference voltage V2 is connected to the inverting input terminal, a low level of voltage is outputted from the OP amplifier 19. This voltage is inputted to the inverting input terminal of the PWM comparator 12 through the diode D3, compared with a sawtooth-like wave of the sawtooth-like wave generating circuit 13, and a PWM wave is generated. Then, the output voltage of the PWM comparator 12 is inputted to the power MOS drive circuit 11, and the switching element Q1 is switched.

At the transformer T2 of the secondary side of the transformer T, a voltage which is stepped up by the switching operation of the switching element Q1 at the primary side, is generated. A current due to the voltage generated at the transformer T2 charges the capacitor C2 through the diode D1. A voltage across the capacitor C2 is divided and detected by the resistors R1, R2 and the resistor R3 of the output voltage detecting circuit 2, and the detected result is inputted to the non-inverting input terminal of the OP amplifier 19 of the differential amplifying circuit 7.

In this case, the reference voltage V2 is connected to the inverting input terminal of the OP amplifier 19. If the input voltage value is lower than the reference voltage V2, no input exists at the inverting input terminal of the PWM comparator 12. Therefore, the voltage of the secondary side of the transformer T is raised, and the voltage of the capacitor C2 is raised. Here, the resistor R6 connected in parallel with the OP amplifier 19 is installed to regulate the gain of the OP amplifier 19. The capacitor C6 is used to delay the phase of the output to stabilize the operation of the entire lighting device.

The current due to the voltage generated in the transformer T3 charges the capacitor C5 of the igniter 5 through the diode D2 and the resistor R5. Here, the capacitor C3 is used as a smoothing capacitor for mainly smoothing the voltage from the transformer T3. When the voltage of the capacitor C5 is raised sufficiently to the voltage that the gas arrester GA results in dielectric breakdown, the gas arrester GA is electrically conducted, and a current starts flowing to the pulse transformer L. Thus, a high voltage pulse is applied to the high-pressure discharge lamp 6, dielectric breakdown occurs in the high-pressure discharge lamp 6 to cause a glow discharge to occur.

Here, the capacitor C4 functions as a filter so as not to flow back the high-pressure pulse to the DC/AC inverter circuit 4 in the high-pressure discharge lamp 6. Further, after the high-pressure pulse is applied to the high-pressure discharge lamp 6, the voltage of the capacitor C5 is lowered. Therefore, the gas arrester GA is again insulated, and the igniter 5 becomes a substantially not operating state. Here, up to this point, the switch S2 is in the state that the connection between the drive circuits 14 to 17 and the rectangular low frequency generating circuit 18 is cutoff, as shown in the drawing.

When the dielectric breakdown occurs in the high-pressure discharge lamp 6 so that the glow discharge occurs, the charge stored in the capacitor C2 abruptly flows to the high-pressure discharge lamp 6 as a lamp current through the DC/AC inverter circuit 4. The high-pressure discharge lamp 6 transfers from the glow discharge to the arc discharge by this current, and starts lighting. The lighting immediately after this maintains the lighting state called a DC lighting that maintains the same polarity for a relatively long time.

Here, in the output voltage detecting circuit 2, the voltage is detected by the voltage division of the resistor R1 and the resistors R2, R3, and the detected voltage is inputted to the lighting detecting circuit 21. In the lighting detecting circuit 21, the charge of the capacitor C2 is supplied to the high-pressure discharge lamp 6, detecting the drop of the voltage.

Counting of the lighting time counting timer 22 starts by this detecting, and the switch S2 is switched after a predetermined time is elapsed from the start of the counting. Thus, the drive circuits 14 to 17 and the rectangular low frequency generating circuit 18 are connected.

When the switch S2 is switched, the rectangular low frequency of the output of the rectangular low frequency generating circuit 18 is inputted to the drive circuits 14 to 17 through the buffer BUF and the inverter INV, and the switching elements Q2 to Q5 are ON/OFF controlled.

Under this control, when the switching elements Q2, Q5 are ON, switching elements Q3, Q4 are OFF, while, when the switching elements Q2, Q5 are OFF, the switching elements Q3, Q4 are ON, that is, the switching elements Q2 to A5 repeat a polarity inversion. Thus, an AC power of substantially rectangular wave is generated at the output side of the DC/AC inverter circuit 4, and the high-pressure discharge lamp 6 transfers to lighting at a stable time.

Here, "substantially rectangular wave" means the case that shows a waveform near the rectangular wave has, such as instantaneous rise, fall or flat characteristics. In other words, "substantially rectangular wave" includes the case that the rise or fall takes about several 10 microseconds, or has fundamentally flat characteristics, however, a certain part is projected or recessed.

Then, constant power control of the high-pressure discharge lamp 6 will be described. This constant power control is performed according to the measured result of the output voltage detecting circuit 2 and the output current detecting circuit 3. The result of the voltage detection of the output voltage detecting circuit 2 is inputted to the dividing circuit 24. Further, to the dividing circuit 24, the power that should be supplied to the high-pressure discharge lamp 6 in that state is inputted by the target power value setting circuit 23 operated by the output from the lighting time counting circuit 22.

Therefore, a signal for obtaining an ideal current value is outputted from the dividing circuit 24 and the signal is inputted to the inverting input terminal of the OP amplifier 20 of the differential amplifying circuit 8. Then, to the non-inverting input terminal of the OP amplifier 20, the current detection result of the current detecting circuit 3 is inputted, and the signal by the comparison is inputted to the inverting input terminal of the PWM comparator 12. Therefore, the duty ratio of the switching element Q1 is changed, and the high-pressure discharge lamp 6 is constant-power controlled.

Figure 2:
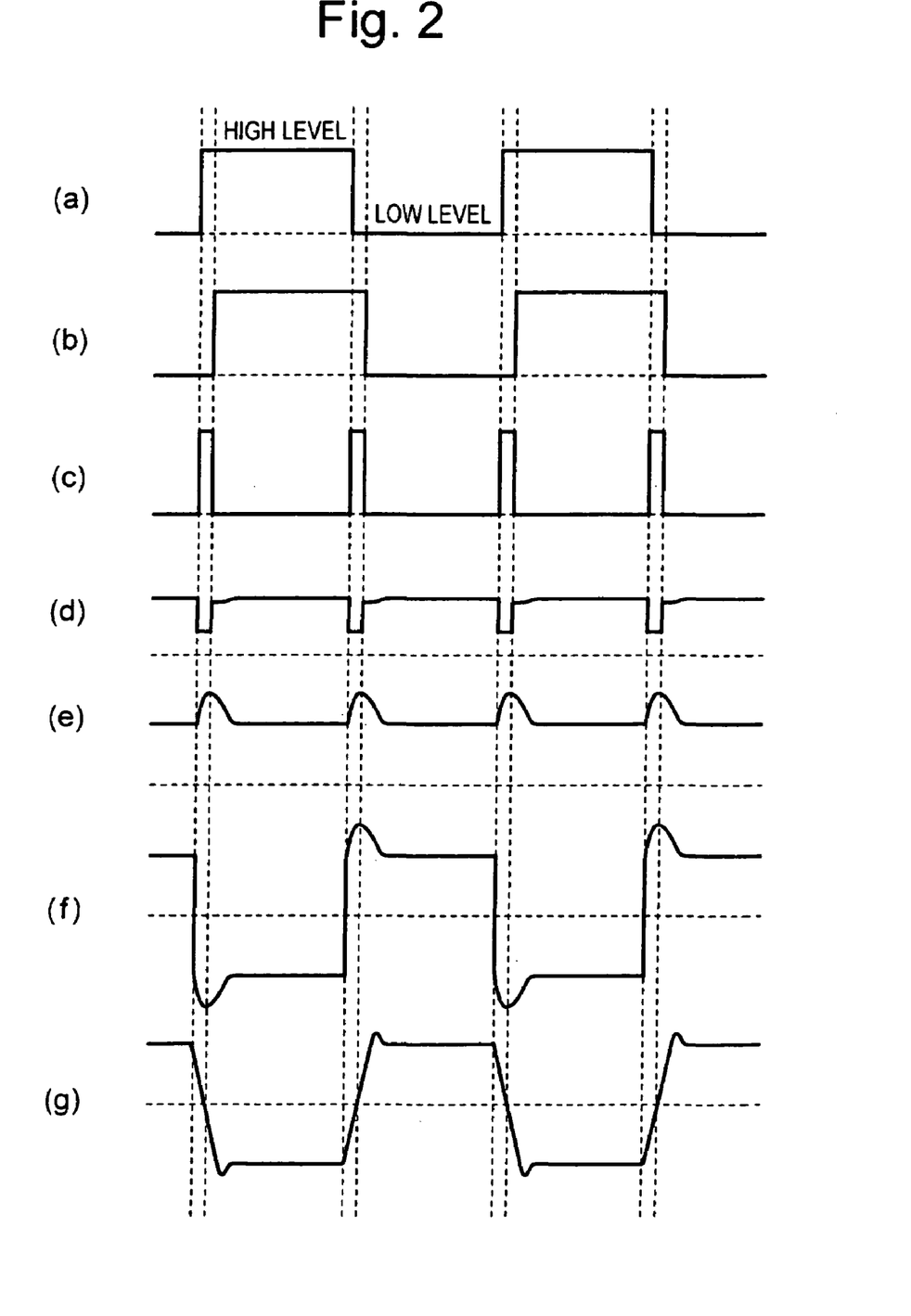
FIG. 2 is a time chart diagram for explaining an operation of raising a voltage of a DC/DC converter circuit during polarity inversion of the lighting device shown in FIG. 1.

A circuit is connected to the inverting input terminal of the PWM comparator 12, at the starting time of the polarity inversion, the circuit transmits a signal for increasing the voltage to the switching element Q1, while, at the polarity inversion time, the circuit transmits a signal for stopping the signal for increasing the voltage. The operation of this circuit will be described by referring to FIG. 2 showing a time chart for explaining the operation for raising the voltage of the DC/DC converter circuit during the polarity inversion.

A rectangular wave generated from the rectangular low frequency generating circuit 18 is exclusive ORed with the rectangular wave generated from the delay circuit 26 for delaying a predetermined time in the same waveform as the rectangular low frequency generating circuit 18 by the logical circuit 27 and becomes a pulse-like output waveform (a). If this pulse-like output waveform is inputted to the base of the transistor TR1, when the input is a high level, the transistor TR1 is in an ON state, while when the input is a low level, the transistor TR1 is in an OFF state. Then, during the ON period of the transistor TR1, an input signal to the inverting input terminal of the PWM comparator 12 is lowered, while during the OFF period of the transistor TR1, it is returned to an original state after a predetermined time.

As a result, as the input signal of the inverting input terminal of the PWM comparator 12 is lowered, the signal broadens the ON time of the switching element Q1 for the time lowered, therefore, the output voltage of the DC/DC converter circuit 1 is raised than usual. Thus, the high-pressure discharge lamp 6 generates the lighting waveform of the substantially rectangular wave that shows no time for not flowing the current that becomes a cause of discharge delay.

In this embodiment, a time of the high level of the output waveform of the logical circuit 27 is set, from when the polarities of the switching elements Q2 to Q5 of the DC/AC inverter circuit 4 are switched, to a time when the lamp current $I_L$ flowing to the high-pressure discharge lamp 6 zero-crosses. A desired high-level time can be set by previously measuring by means of an experiment. Here, the "zero cross" is a time point when the current becomes zero.

The setting of the rise of the high level may be performed immediately before or after the time when the polarities of the switching elements Q2 to Q5 of the DC/AC inverter circuit 4 is switched. Even in this case, the output voltage of the predetermined period of the DC/DC converter circuit 1 can be raised. However, if it is set immediately after the switching, the voltage increase is low, alternatively, if it is set immediately before the switching, the lamp current IL is increased, it is desired when the polarities of the switching elements Q2 to A5 of the DC/AC inverter circuit 4 is switched.

Further, reason for setting the time of the fall of the high level is to suppress the increase of the lamp current $I_L$. This setting is performed to prevent the occurrence of unstable discharge, which is caused in the constant power control, when the lamp current $I_L$ excessively increases, and the excessively increased current part must be lowered at the other part.

Figure 3:
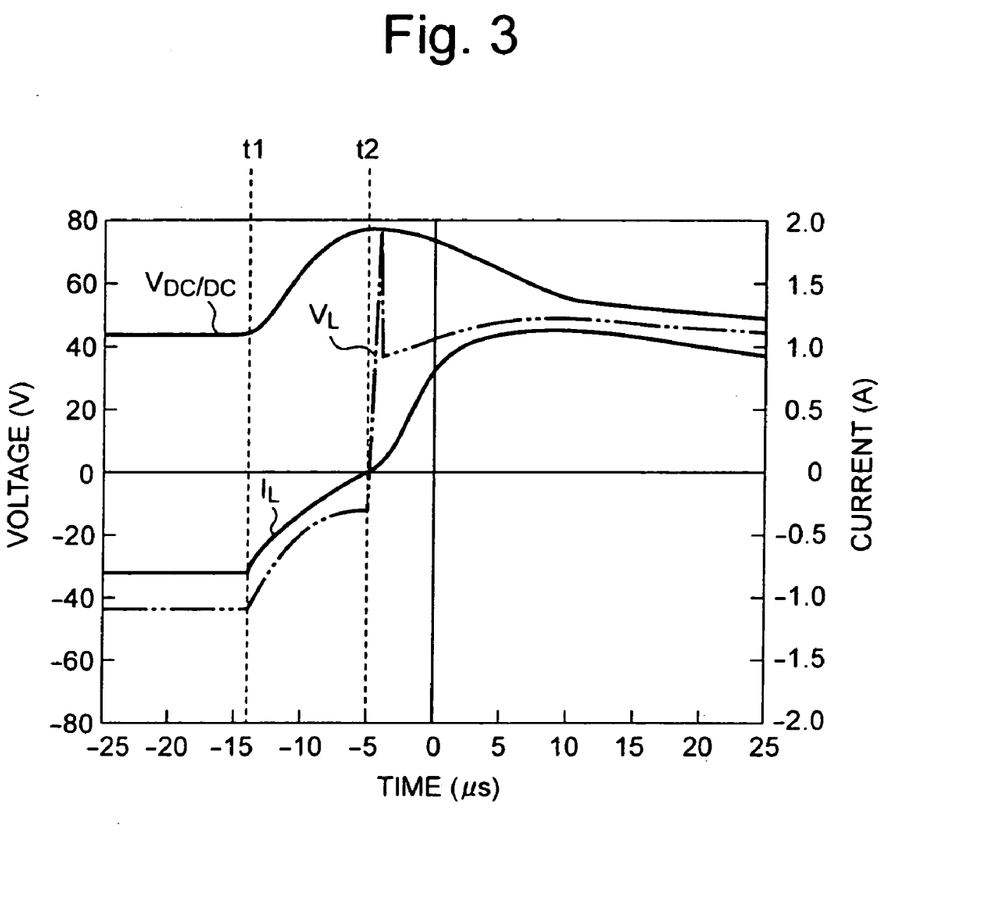
FIG. 3 is an explanatory view for explaining the vicinity of the polarity inversion time of an output waveform when the signal of FIG. 2 is inputted.

FIG. 3 is a view for explaining the vicinity of the polarity inversion time of the output waveform when the signal of FIG. 2 is inputted. Here, a $V_{DC/DC}$ is a voltage across the capacitor C2, that is, an output voltage of the DC/DC converter circuit 1, and $V_L$, $I_L$ are respectively the lamp voltage, the lamp current of the high-pressure discharge lamp 6, with the direction shown in FIG. 1 as a reference. t1 is the timing of inverting the polarity of the switching elements Q2 to Q5 of the DC/AC inverter circuit 4, and t2 is the timing of zero cross of the lamp current $I_L$.

In the drawing, up to the t1, only the switching elements Q3, Q4 of the DC/AC inverter 2 are ON states, and the stable power is supplied from the DC/DC converter circuit 1. The output voltage $V_{DC/DC}$ of the DC/DC converter circuit 1 at this time is a constant voltage of about 45V, the lamp voltage $V_L$ is a voltage at the stable time of about 45V, and in the lamp current $I_L$, a negative constant voltage and a constant current of about 0.77 A flow.

At the t1, when only the switching elements Q3, Q4 of the DC/AC inverter 2 are switched from ON states and only the switching elements Q2, Q5 are switched to ON states, the lamp voltage $V_L$, the lamp current $I_L$ gradually approach to "0". This is because an energy stored in the pulse transformer L is released, and this releasing time is proportional to an amount of energy stored in the pulse transformer L. When all the energy of the pulse transformer L is discharged, the lamp current $I_L$ becomes "0". Note that, while the energy of the pulse transformer L is discharged, the output voltage $V_{DC/DC}$ of the DC/DC converter circuit 1 continues voltage raising since the capacitor C2 is charged. In the present invention, since the output voltage $V_{DC/DC}$ of the DC/DC converter circuit 1 is provided to be further raised during this time, the voltage is raised than usual.

In the next moment that the lamp current $I_L$ becomes "0", the lamp voltage $V_L$ and inverted lamp current $I_L$ flow out. This is because, at the polarity inverting time of the current flowing to the high-pressure discharge lamp 6, the output voltage $V_{DC/DC}$ of the DC/DC converter circuit 1 was raised 1.5 times as large as the voltage at the stable lighting time, according to the present invention.

Thus, by maintaining the state that the current always flows to the lamp current $I_L$, it has been confirmed that the discharge delay, etc., does not occur, and the flicker does not occur. Incidentally, in the drawing, since the output voltage $V_{DC/DC}$ of the DC/DC converter circuit 1 is 75V and the lamp voltage $V_L$ at the stable time is 45V, the output voltage $V_{DC/DC}$ is raised about 1.7 times as large as the voltage at the stable time.

Incidentally, in the lighting device for high-pressure discharge lamp which does not adopt the present invention, the output voltage $V_{DC/DC}$ of the DC/DC converter circuit 1 was about 1.3 times as large as the lamp voltage $V_L$ at the stable time. In this case, it has been confirmed that after the lamp current $I_L$ becomes "0", a waveform shows that the current does not flow for a short time and the flicker occurs in the high-pressure discharge lamp 6.

Thereafter, the lamp voltage $V_L$, the lamp current $I_L$ gradually approach to values at the stable lighting time through raising and/or lowering.

In this embodiment, by broadening the ON time of the duty ratio of the switching element Q1 during the period between the switching elements Q2 to Q5 of the DC/AC inverter circuit 4 are polarity inverted and the lamp current $I_L$ flowing to the high-pressure discharge lamp 6 zero-crosses, the output voltage of the DC/DC converter circuit 1 when the lamp current $I_L$ zero-crosses, can be raised. The occurrence of the flicker in the high-pressure discharge lamp can be prevented by raising the output voltage $V_{DC/DC}$ of the DC/DC converter circuit 1, 1.5 times or more as large as the lamp voltage $V_L$ at the stable lighting time of the high-pressure discharge lamp 6.

Also, since this embodiment is a lighting system for increasing the voltage value in regard to a conventional art, it is not necessary to increase the durability of the element. That is, the occurrence of the flicker in the high-pressure discharge lamp can be prevented without increase in the cost and without increase in size of the lighting device.

(Second Embodiment)

Figure 4:
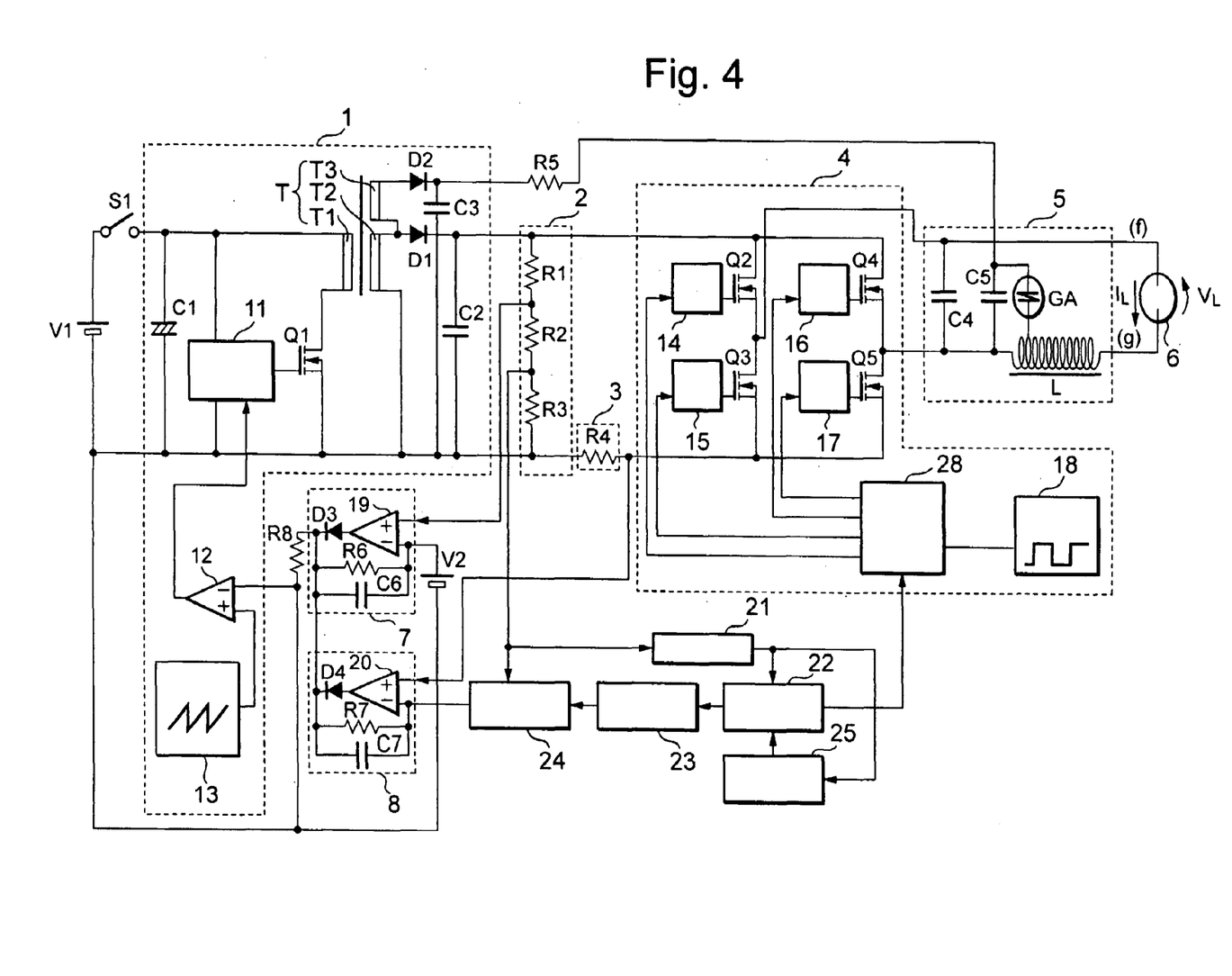
FIG. 4 is a view showing a circuit configuration of the lighting device for high-pressure discharge lamp according to a second embodiment of the present invention.

FIG. 4 is a view showing a circuit configuration of a lighting device for high-pressure discharge lamp according to a second embodiment of the present invention. In the respective portions of the second embodiment, the same portions as the respective portions of the lighting device for high-pressure discharge lamp of the first embodiment of FIG. 1 designate the same reference numerals, and the description will be omitted.

The second embodiment differs from the first embodiment in the following point. Since the second embodiment is not a system for raising the output voltage of the DC/DC converter circuit 1 by regulating the duty ratio of the switching element Q1, only a signal from the differential amplifying circuit 7 or the differential amplifying circuit 8 affects the inverting input terminal of the PWM comparator 12.

Figure 5:
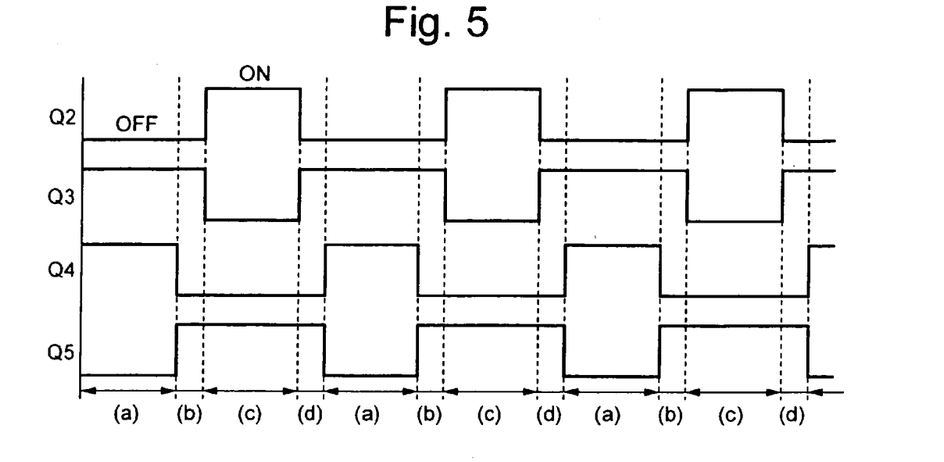
FIG. 5 is a time chart diagram for explaining a rectangular wave by a control circuit.

Furthermore, a control circuit 28 including a function of the switch SW2 is connected instead of the buffer BUF, the inverter INV and the switch SW2. Under this control circuit 28, signals inputted to the switching elements Q2 to Q5 are respectively converted as shown in FIG. 5 showing a time chart for explaining the rectangular wave by the control circuit from the rectangular wave of the rectangular low frequency wave generating circuit 25. Here, (a) to (d) in FIG. 5 show the times in the respective switching states.

FIGS. 6A to 6D are equivalent circuit diagrams for explaining an operation of the DC/AC inverter circuit by the control circuit shown in FIG. 5. Here, S2 to S5 in FIG. 5 are the states of the switching operation of the switching elements Q2 to Q5, and D2 to D5 are the states of parasitic diodes of the switching elements Q2 to Q5 of the MOSFET. FIG. 6A to FIG. 6D correspond to the times (a) to (d) in FIG. 5.

Figure 6A:
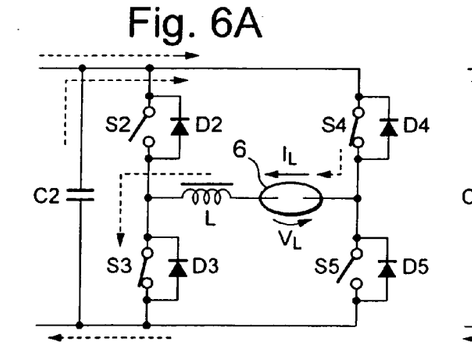
FIGS. 6A, 6B, 6C, 6D are equivalent circuit diagrams for explaining operations of DC/AC inverter circuits by the control circuit shown in FIG. 5.

The rectangular waves of FIGS. 6A to 6D are respectively inputted to the switching elements Q2 to Q5 by the control circuit 28, and the DC/AC inverter circuit 4 is operated. In FIG. 6A of the first control, only the switching elements Q3, Q4 are ON states, and the switch S4, the high-pressure discharge lamp 6, the pulse transformer L and the switch S3 are conducted. Therefore, the currents flow from the DC/DC converter circuit 1 and the capacitor C2.

Figure 6B:
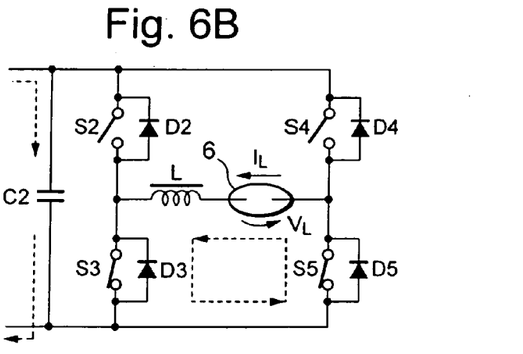

In FIG. 6B of the third control, only the two switching elements Q3, Q5 disposed at the low voltage side of the DC/AC inverter circuit 4 are ON, the switch S3, the high-pressure discharge lamp 6, the pulse transformer L and the switch S5 are conducted, and a closed circuit is constructed. Therefore, since the current due to the energy stored in the pulse transformer L flows in the closed circuit, the energy of the pulse transformer L is not batch discharged, but a time for discharging all the energy can be lengthened. Also, the current from the DC/DC converter circuit 1 does not flow to the DC/AC inverter circuit 4, but flows in a direction for charging the capacitor C2.

Figure 6C:
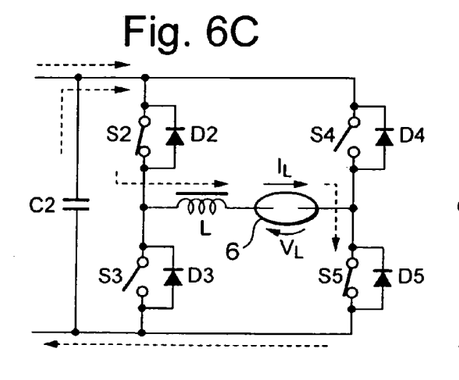

In FIG. 6C of the second control, only the switching elements Q2, Q5 are ON states, and the switch S2, the high-pressure discharge lamp 6, the pulse transformer L and the switch S5 are conducted. Therefore, the current from the DC/DC converter circuit 1 and the capacitor C2 flows in the direction opposite to the direction shown in FIG. 6A, and the lamp voltage $V_L$, the lamp current $V_L$ become opposite polarities in regard to FIG. 6A.

Figure 6D:
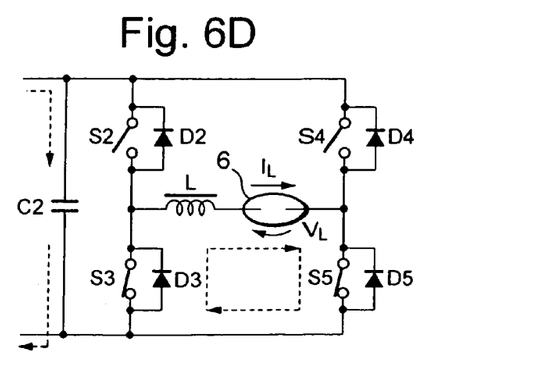

In FIG. 6D of the third control, it becomes the same circuit state as FIG. 6B shows, but the direction of the current in the closed circuit by the switch S3, the high-pressure discharge lamp 6, the pulse transformer L and the switch S5, becomes an opposite direction to the FIG. 6B, by the energy stored in the pulse transformer L. Thereafter, the lighting with the rectangular wave at the stable time repeats the states shown in FIG. 6A to FIG. 6D.

Figure 7:
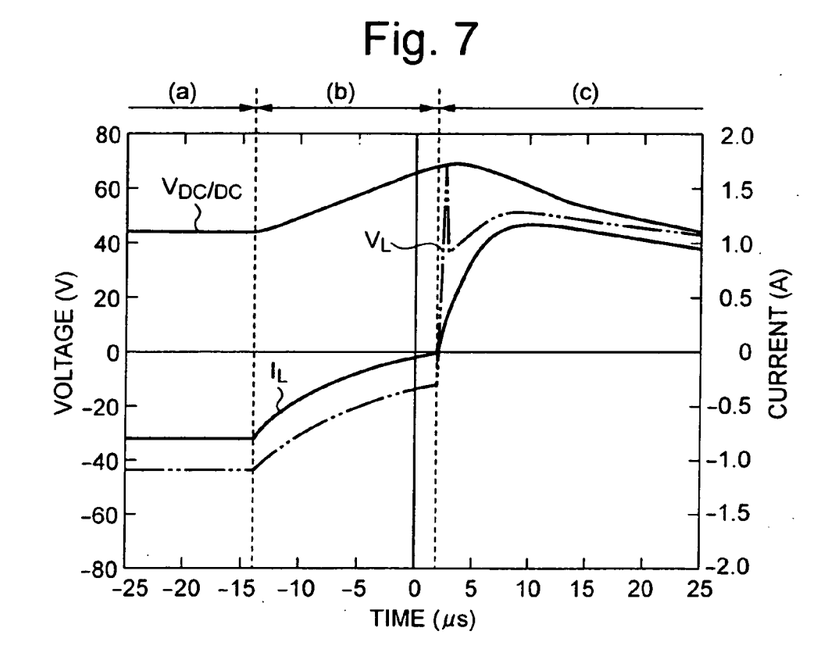
FIG. 7 is an explanatory view for explaining the vicinity of a polarity inverting time of the output waveform in the operation of the circuit shown in FIG. 6.

FIG. 7 is an explanatory view for explaining the vicinity of the polarity inversion time of the output waveform in the operation of the circuit shown in FIG. 6. Here, (a) to (c) in FIG. 7 correspond to (a) to (c) in FIG. 5.

With regard to FIG. 7, in a last half of (a), since a stable power is supplied from the DC/DC converter circuit 1, the output voltage $V_{DC/DC}$ of the DC/DC converter circuit 1 is a constant voltage of about 45V, the lamp voltage $V_L$ is a voltage at the stable time of about 45V, and in the lamp current $I_L$, negative voltage and current of about 0.77 A flow.

When switched from the state of FIG. 6A to that of FIG. 6B, the lamp voltage $V_L$, the lamp current $I_L$ gradually approach "0". This is because, as described in the above-mentioned first embodiment, the energy stored in the pulse transformer L is discharged. Here, in this embodiment, since it becomes the circuit state of FIG. 6B, the energy stored in the pulse transformer L is hardly lost, and the time until the current becomes completely "0" is lengthened. And, during this period, the capacitor C2 is continuously charged, and the voltage is continuously raised.

When the current of the lamp current $I_L$ becomes "0", it is switched to the circuit state of FIG. 6C. Then, the polarities of the lamp voltage $V_L$, and the lamp current $I_L$ are inverted instantaneously, and immediately thereafter, the lamp voltage $V_L$ is temporarily raised to the voltage near the output voltage $V_{DC/DC}$ of the DC/DC converter circuit 1. The lamp voltage $V_L$ gradually approaches the voltage value at the stable time through raising and/or lowering. Also, the lamp current $I_L$ gradually approaches the current value at the stable time through raising and/or lowering, from the current is "0".

The output voltage $V_{DC/DC}$ of the DC/DC converter circuit 1 when the polarity of the lamp current $I_L$ is inverted is raised to about 1.7 times as large as the lamp voltage of the high-pressure discharge lamp 6.

Here, when compared with the waveform near the polarity inverting time in the first embodiment of FIG. 3, it is understood that the time until the lamp current $I_L$ becomes "0" is extended, and the output voltage $V_{DC/DC}$ of the DC/DC converter circuit 1 is raised during that time.

In this embodiment, the charging time of the capacitor C2 is lengthened by extending the time of discharging the energy of the pulse transformer L, and the output voltage $V_{DC/DC}$ of the DC/DC converter circuit 1 can be raised to a predetermined voltage.

Incidentally, this embodiment is not limited to the above-mentioned embodiment. For example, this embodiment may be changed as follows.

For example, when a switching element having a parasitic diode as the MOSFET is used, control may be performed. In the state of FIG. 6B, only the switch S3 is ON, while in the state of FIG. 6D, only the switch S5 is ON.

In the circuits shown in FIGS. 6B and 6D, switching elements Q2 to Q5 disposed at the low voltage side are ON, however, those at the high voltage side may be ON. Alternatively, the high voltage side and the low voltage side may be switched between the circuits in FIGS. 6B and 6D.

Figure 8:
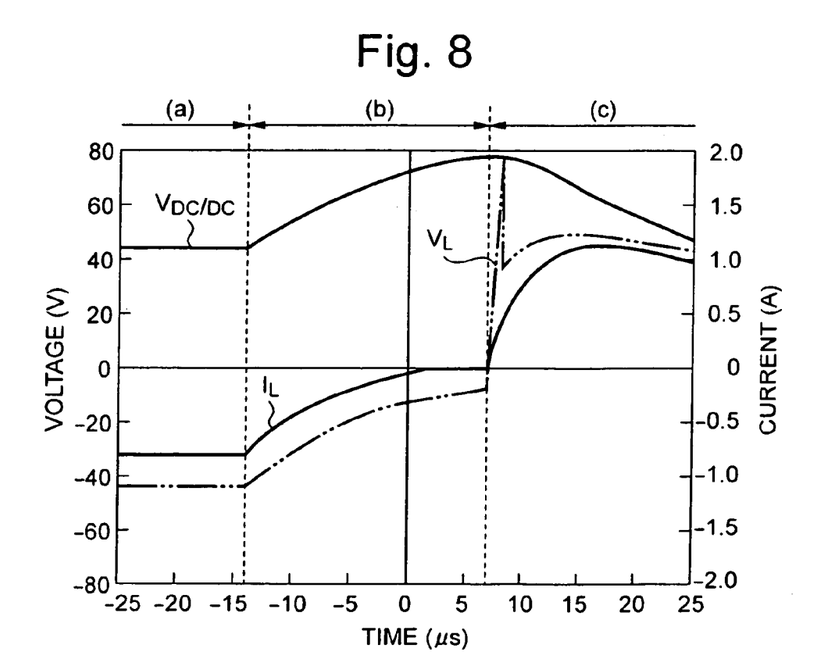
FIG. 8 is a view showing other output waveform in the operation of the circuit shown in FIG. 6.

Also, like an explanatory view of other output waveform of FIG. 8, slightly after the lamp current $I_L$ becomes "0", the polarity of the switching element of the DC/AC inverter circuit 4 may be switched. In this case, too, it is confirmed that the occurrence of flicker can be suppressed.

However, this is limited to the case that when the time in which the current does not flow to the high-pressure discharge lamp 6, is 20 μs or less and at the polarity inversion time of the lamp current $I_L$, the output voltage $V_{DC/DC}$ of the DC/DC converter circuit 1 is sufficiently raised the lamp voltage $V_L$ at the stable time.

Incidentally, the present invention is not limited to the above-mentioned embodiment. For example, the present invention may be changed as follows.

The relationship $V_{DC/DC}/V_L$ between the output voltage $V_{DC/DC}$ of the DC/DC converter circuit 1 and the voltage $V_L$ at the stable lighting time of the high-pressure discharge lamp 6 when the polarity of the current of the present invention is inverted, is desirably preferably 1.7 times or more. In this case, an especially large effect is obtained for flicker. Further, the upper limit of the $V_{DC/DC}/V_L$ is not particularly set, however, the effect of the present invention can be obtained even if the $V_{DC/DC}/V_L$ is set to be as large value as possible.

As another means for setting the output voltage of the DC/DC converter circuit 1 to 1.5 times or more than the lighting voltage at the stable time of the high-pressure discharge lamp 6, there is a technique for sufficiently increasing the inductor L of the igniter 5. This can lengthen the time until the lamp voltage Vl of the high-pressure discharge lamp 6 is polarity inverted in the same manner as the second embodiment by an increase of an energy of the inductor L even by an operation of the DC/AC inverter circuit 4 as a conventional art. Thus, the charging time of the capacitor C2 can be lengthened, and the output voltage $V_{DC/DC}$ of the DC/DC converter circuit 1 can be raised.

Further, by reducing the capacity of the capacitor C2, and accelerating the raising speed of the voltage, the output voltage of the DC/DC converter circuit 1 may be raised before the energy of the inductor L runs down. However, according to this technique, it is conceivable that a ripple is increased in the output current and the circuit operation becomes unstable, due to a lack of capacity of capacitor C2. Therefore, it is desired to reduce the ripple by raising the operation frequency of the DC/DC converter circuit 1.

Also, immediately before the polarity inversion of the switching elements Q2 to Q5 of the DC/AC inverter circuit 4, when a pulse-like current of the degree that the discharge does not become unstable in other portion, for example, a pulse-like current of 5% or less of the half a period of the lamp current waveform in time width, and the current value is about 1.5 times as large as the stable current value is superposed, further effect is obtained in regard to flicker.

(Third Embodiment)

The present invention can be applied to, for example, a lighting device for a single-ended mold high-pressure discharge lamp, in which the temperature of the electrodes of the discharge lamp differ, such as a headlight of the automobile. Such an embodiment of the present invention will be described.

Figure 9:
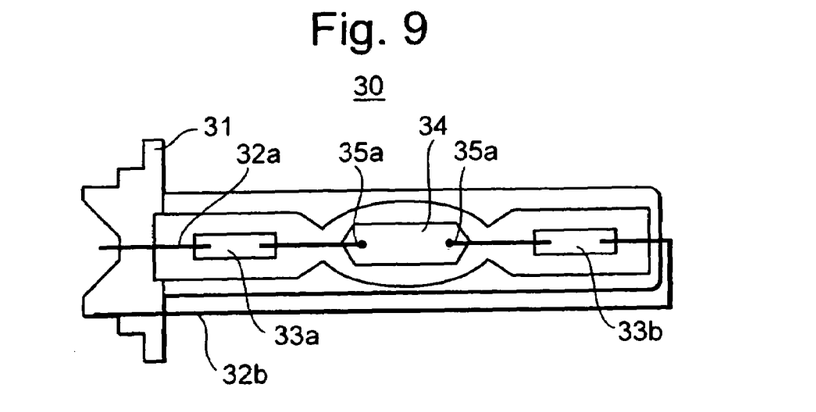
FIG. 9 is a view showing a structure of a single-ended mold high-pressure discharge lamp applied with the present invention.

Generally, the single-ended mold high-pressure discharge lamp 30, such as a headlight of an automobile, has a structure as shown in FIG. 9. That is, metal foils 33a, 33b are respectively connected to electrodes 32a, 32b provided oppositely in a light emitting tube 31, and external lead wires 34a, 34b for applying a power from an outside source are respectively connected to these metal foils 33a, 33b. In the single-ended mold high-pressure discharge lamp of such a structure, as shown in FIG. 9, a heat is positively dissipated in a direction of a base, however, since the radiation of heat in an opposite direction is remarkably small as compared with the former direction, temperatures of distal ends of the electrodes 32a, 32b which discharge electricity, are different. This difference of the distal end temperatures of the electrodes causes unevenness of the light emission distribution and remarkably shortens the lifetime of the discharge lamp.

In this embodiment of the present invention, the lighting device which can prevent the shortening of lifetime of the single-ended high-pressure discharge lamp as described above is obtained.

Figure 10:
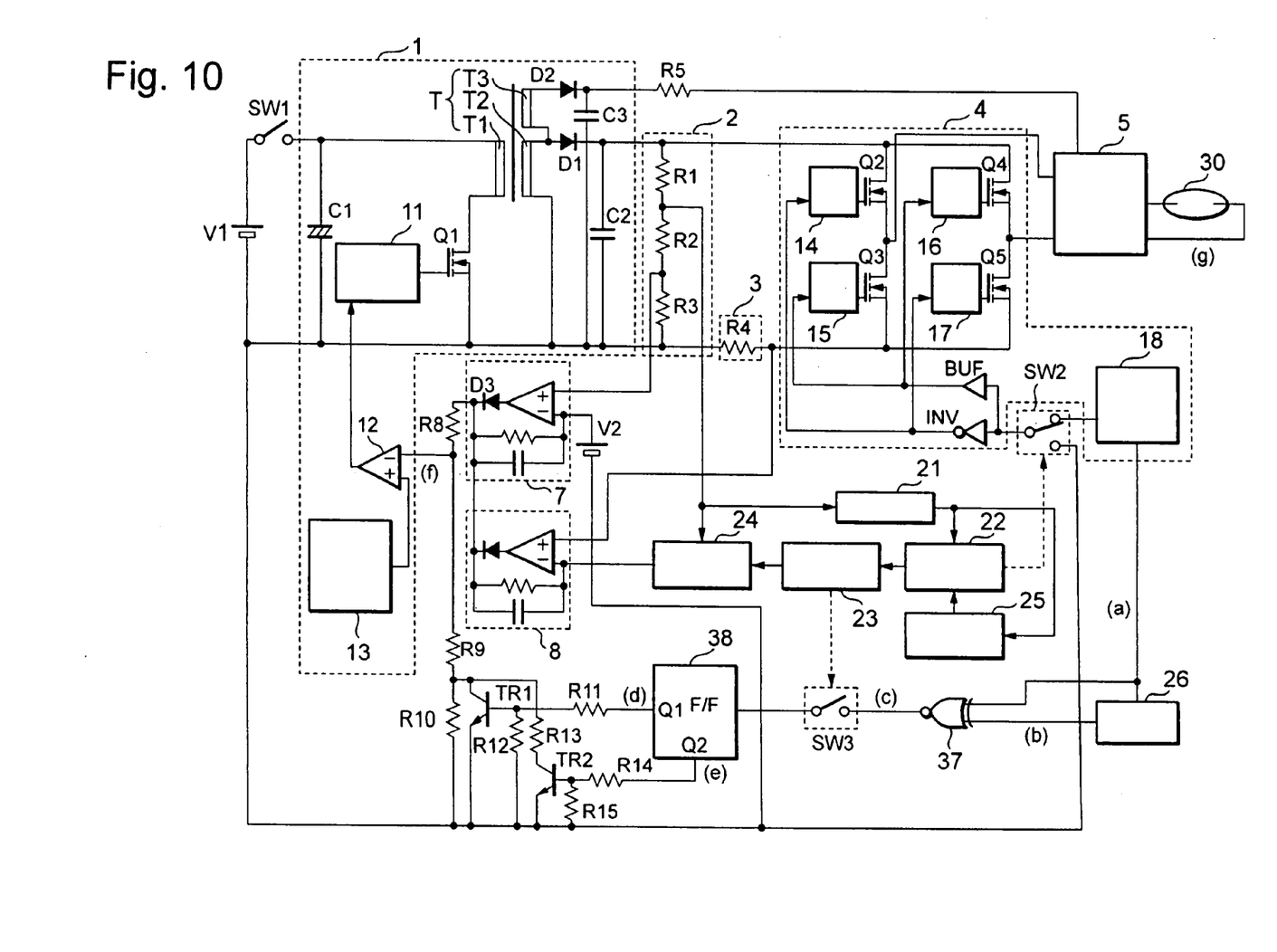
FIG. 10 is a view showing a circuit configuration example of a lighting device according to a third embodiment of the present invention.

The embodiment of the present invention will be described with reference to the drawing. FIG. 10 shows a circuit configuration example of the lighting device of this embodiment of the present invention. In FIG. 10, circuits similar to those in FIG. 1 are denoted by the same numbers and symbols.

This lighting device includes a DC power source V1, a switch SW1, a DC/DC converter circuit 1, an output voltage detecting circuit 2, an output current detecting circuit 3, a DC/AC converter circuit 4, an igniter 5, a single-ended mold high-pressure discharge lamp 6 and a control circuit for controlling them.

The transformer t included in the DC/DC converter circuit 1 includes a primary side transformer T1, and secondary side transformers T2, T3. In the DC/DC converter circuit 1 for performing voltage lowering or voltage raising, a primary side of the transformer T is constructed by a capacitor C1, a switching element Q1, a power MOS drive circuit 11, a PWM comparator 12, a sawtooth-like wave generating circuit 13 and the transformer T1. The secondary side of the transformer T connected to the DC/AC inverter circuit 4 is constructed by the transformer T2, the diode D1, and the capacitor C2. Also, the secondary side of the transformer T connected to the igniter 5 is constructed by the transformer T3, the diode D2 and the capacitor C3.

The connecting relation of the primary side of the transformer T will be described. For example, the switching element Q1 of, for example, a MOSFET is connected in series with the DC power source V1, the switch SW1 and the transformer T1, and the power MOS drive circuit 11 is connected to the gate of the switching element Q1.

An output terminal of the PWM comparator 12 is connected to the power MOS drive circuit 11, and an output terminal of the sawtooth-like wave generating circuit 13 is connected to a non-inverting input terminal of the PWM comparator 12. The capacitor C1 is connected in parallel with the DC power source V1 through the switch SW1. As will be described later in detail, this embodiment has a feature that the width of the pulse supplied from the PWM comparator 12 to the power MOS drive circuit 11 of the DC/DC converter circuit 1 is changed.

The connecting relation of the secondary side of the transformer T which is connected to the DC/AC inverter circuit 4 will be described. The transformer T2 is connected in series with the diode D1, and the capacitor C2 is connected in parallel with the transformer T2 through the diode D1. Then, the connecting relation of the secondary side of the transformer T which is connected to the igniter 5 will be described. The transformer T3 is connected in series with a mid-point between the transformer T2 and the diode D1 and the diode D2 to construct the output to the igniter 5. The capacitor C3 is connected in parallel with the transformer T3 through the diode D2.

The output voltage detecting circuit 2 includes resistors R1, R2 and R3 connected in series, and this output voltage detecting circuit 2 is connected to the output side from the capacitor C2 and in parallel with the capacitor C2. The output current detecting circuit 3 includes a resistor R4, and is arranged between the output voltage detecting circuit 2 and the DC/AC inverter circuit 4 and connected to the low-voltage sides thereof.

The DC/AC inverter circuit 4 includes, for example, switching elements Q2, Q3, Q4, and Q5 each made of an MOSFET, drive circuits 14, 15, 16 and 17, a rectangular low frequency generating circuit 18, a buffer BUF, and an inverter INV. In the connecting relation, the switching elements Q2, Q3 and the switching elements Q4, Q5 are respectively connected in series, they are connected in parallel with the output terminal of the DC/DC converter circuit 2, constructing a so-called full-bridge circuit.

Output terminals of the DC/AC inverter circuit 4 are respectively provided from the connecting points of the switching elements Q2, Q3 and the switching elements Q4, Q5, and connected to input terminals of the igniter 5. The drive circuits 14, 15, 16 and 17 are respectively connected to the gates of the switching elements Q2, Q3, Q4 and Q5. The drive circuits 15, 16 and the drive circuits 14, 17 are connected to a rectangular low frequency generating circuit 18 through the buffer BUF and the inverter INV, respectively, and further through SW2 to be described later.

The igniter 5 inputs an AC output of the DC/AC converter circuit 4 to light the single-ended mold high-pressure discharge lamp 6.

The single-ended mold high-pressure discharge lamp 30 is a lamp which does not contain mercury in a discharge space, but evaporates a metal halogenide and a rare gas instead of emitting a light, and is connected to the output terminal of the DC/AC inverter circuit 4 through a pulse transformer (not shown) of the igniter 5.

Also, as a structure of the control circuit for controlling the switching element Q1 of the DC/DC converter circuit 1, a differential amplifying circuit 7, a reference voltage source V2, a resistor R8, a lighting detecting circuit 21, a lighting time counting timer 22, a target power value setting circuit 23, a dividing circuit 24, a lights-out time counting timer 25, a switch SW2, a differential amplifying circuit 8, a delay circuit 26, a logical circuit 37, a switch SW3, a flip-flop circuit 38, a transistor TR1, resistors R9, R10, R11, R12, R13, R14, and R15 are used.

When the lighting is detected by the lighting detecting circuit 21, the detection signal is inputted to the lighting time counting timer 22 and the lights-out time counting timer 25, and the lighting time counting timer 22 controls the switch SW2 so as to make an output of the rectangular low frequency generating circuit 18 supplied to the buffer BUF and the inverter INV after a predetermined time.

Each of the differential amplifying circuit 7 and the differential amplifying circuit 8 has an operational amplifier, a diode, a resistor and a capacitor. A voltage detecting point between the resistor R1 and the resistors R2, R3 of the output voltage detecting circuit 2 is connected to the non-inverting input terminal of the input of the operational amplifier of the differential amplifying circuit 7. To the inverting input terminal of the operational amplifier, the reference voltage source V2 is connected, and to the output terminal of the operational amplifier, the diode D3 is connected in series. Also, to the series connection of the operational amplifier of the differential amplifying circuit 7 and the diode, a resistor and a capacitor are connected in parallel. The output terminal of the differential amplifying circuit 7 is connected to the inverting input terminal of the PWM comparator 12 through the resistor R8.

To the non-inverting input terminal of the operational amplifier of the differential amplifying circuit 8, a voltage detecting point between the resistor R4 of the output current detecting circuit 3 and the DC/AC inverter circuit 4, is connected. To the inverting input terminal of this operational amplifier, the dividing circuit 24 is connected.

To the dividing circuit 24, a voltage detecting point between the resistor R2 and the resistor R3 of the output voltage detecting circuit 2 is connected to the target power value setting circuit 23 through the lighting detecting circuit 21 and the lighting time counting timer 22. Also, to the lighting time counting timer 22, the lighting detecting circuit 21 is connected through the lights-out time counting timer 25. To the lighting time counting timer 22, the switch SW2 for switching after a predetermined time when an input is inputted, is connected. To the target power value setting circuit 23, the switch SW3 for opening or closing when an input is inputted, is connected. Further, the output terminal of the differential amplifying circuit 8 is connected to the inverting input terminal of the PWM comparator 12 through the resistor R8.

Also, to the inverting input terminal of the PWM comparator 12, one end of the resistor R9 is connected. The other end of the resistor R9 is connected to one end of the resistor R10, and the other end of the resistor R10 is connected to a negative terminal of the DC power source V1.

On the other hand, the output terminal of the rectangular low frequency generating circuit 18 and the output terminal of the delay circuit 26 are connected to the two input terminals of the logical circuit 37. This logical circuit 37 is a circuit for outputting an inverting signal of an exclusive OR. The output terminal of this logical circuit 37 is connected to one end of the switch SW3. The other end of the switch SW3 is connected to the input terminal of the flip-flop circuit 38, and two output terminals of the flip-flop circuit 38 are respectively connected to one end of the resistor R11 and a resistor R14. The other end of the resistor R11 is connected to a base of the transistor TR1 and one end of the resistor R12. The other end of the resistor R14 is connected to a base of the transistor TR2 and one end of a resistor R15. The other end of the resistor R12 and the other end of the resistor R15 are connected to a negative terminal of the DC power source V1. A collector of the transistor TR1 is connected to a connecting point of the resistor R9 and the resistor R10. A collector of the transistor TR2 is connected to a connecting point of the resistor R9 and the resistor R10 through he resistor R13. Emitters of the transistor TR1 and TR2 are connected to the negative terminal of the DC power source V1.

The structure of the transistor TR1 and the resistors R11, R12 is the same as that of the transistor TR2 and the resistors R14, R15. To the connecting point of the resistor R9 and the resistor R10, a collector of the transistor TR1 is connected directly, and a collector of the transistor TR2 is connected through a resistor R13.

Subsequently, a circuit operation of this embodiment of the present invention will be described. When the switch SW1 is closed, for example, a voltage is generated in the capacitor C1 by the DC power source V1 of the battery for the automobile of several V to several tens of V. This capacitor C1 operates to suppress a minute voltage variation due to the change of the output current of the DC power source.

When a voltage is generated in the capacitor C1, though not shown, a voltage is supplied to the operational amplifier for the differential amplifying circuit 7. At this time, the voltage of the non-inverting input terminal of this operational amplifier is zero, and since a reference voltage source V2 is connected to the inverting input terminal, a low level is outputted from this operational amplifier. This voltage is inputted to the inverting input terminal of the PWM comparator 12 through the diode D3, compared with a sawtooth-like wave of the output of the sawtooth-like wave generating circuit 13, and a PWM wave is generated as an output of the PWM comparator 12. The output voltage of the PWM comparator 12 is inputted to the power MOS drive circuit 11, and switches the switching element Q1.

At the secondary side of the transformer T, a voltage raised by the switching operation of the switching element Q1 at the primary side is generated. The current by the voltage generated in the transformer T2 is charged in the capacitor C2 through the diode D1. The voltage across the capacitor C2 is voltage divided and detected by the resistors R1, R2 and the resistor R3 of the output voltage detecting circuit 2, and the detected result is inputted to the non-inverting input terminal of the operational amplifier of the differential amplifying circuit 7.

To the input of the inverting input terminal of the operational amplifier of the differential amplifying circuit 7, the reference voltage source V2 is connected. If the input voltage value is lower than the reference voltage source V2, since the input does not exist at the inverting input terminal of the PWM comparator 12, it operates to raise the voltage of the secondary side of the transformer T to raise the voltage of the capacitor C2. Here, the resistor connected in parallel with the operational amplifier is inserted to regulate a gain of the operational amplifier. The capacitor C6 delays the phase of the output to be used for stabilizing the operation of the entire lighting device. The DC-DC converter outputs a constant voltage by a series of these operations.

The current due to the voltage generated in the transformer T3 is charged in the capacitor (not shown) of the igniter 5 through the diode D2 and the resistor R5. This capacitor is used as a smoothing capacitor for mainly smoothing the voltage from the transformer T3. When the voltage of the capacitor becomes sufficiently high, the current starts flowing to a pulse transformer (not shown). Thus, a high voltage pulse is applied to the high-pressure discharge lamp 6, which arises a dielectric breakdown, and glow discharge occurs. Here, though not shown, a capacitor is connected in parallel with the input terminal of the igniter 5, the capacitor is operated as a filter in which the high voltage pulse applied to the high-pressure discharge lamp 6 may not reversely flow to the DC/AC inverter circuit 4. Up to this point, the switch SW2 becomes the state that the connection of the drive circuits 14, 15, 16 and 17 to the rectangular low frequency generating circuit 18 is interrupted.

When dielectric breakdown occurs in the high-pressure discharge lamp 6 to cause a glow discharge to occur, the charge stored in the capacitor C2 abruptly flows to the high-pressure discharge lamp 6 as the lamp current through the DC/AC inverter circuit 4. The high-pressure discharge lamp 6 transfers from the glow discharge to the arc discharge by this current, and starts lighting. The lighting immediately after this maintains the lighting state called the DC lighting for maintaining the same polarity for a relatively long time.

Here, in the output voltage detecting circuit 2, the voltage is detected by the voltage division of the resistor R1 and the resistors R2, R3, and this division voltage is inputted to the lighting detecting circuit 21. In the lighting detecting circuit 21, the charge of the capacitor C2 is supplied to the high-pressure discharge lamp 6, and the drop of the voltage is detected. Counting of the lighting time counting timer 22 is started by this detection, and after a predetermined time is elapsed from the start of the counting, the switch SW2 is switched. Thus, the drive circuits 14 to 17 and the rectangular low frequency generating circuit 18 become a connected state.

When the switch S2 is switched, the rectangular low frequency wave is inputted to the drive circuits 14 to 17 through the buffer BUF and the inverter INV, and the switching elements Q2 to Q5 are ON/OFF controller. Under this ON/OFF control, when the switching elements Q2, Q5 are ON, switching elements Q3, Q4 are OFF, while, when the switching elements Q2, Q5 are OFF, the switching elements Q3, Q4 are ON, that is, the switching elements Q2 to Q5 repeat a polarity inversion.

An AC power of substantially rectangular wave is generated at the output side of the DC/AC inverter circuit 4 by this polarity inversion operation of the switching elements Q2 to Q5, and the high-pressure discharge lamp 30 transfers to lighting at a stable time.

Here, "substantially rectangular wave" means the case that shows a waveform near the rectangular wave has, such as instantaneous rise, fall or flat characteristics. In other words, it includes the case of the waveform that, the rise or fall takes about several 10 microseconds, or has fundamentally flat characteristics, however, a certain parts is projected or recessed.

Then, the constant power control of the high-pressure discharge lamp 30 will be described. This constant power control is performed according to the measured results of the output voltage detecting circuit 2 and the output current detecting circuit 3. The result of the voltage detection of the output voltage detecting circuit 2 is inputted to the dividing circuit 24. Further, to the dividing circuit 24, the power (target power value) that should be supplied to the high-pressure discharge lamp 6 in that state is inputted by the target power value setting circuit 23 operated by the output from the lighting time counting circuit 2. Therefore, in the dividing circuit 24, the target power value is divided by the potential of the connecting point of the resistor R1 and the resistor R2, and the dividing circuit 24 outputs a signal for forming an ideal current value. This output signal is inputted to the inverting input terminal of the operational amplifier of the differential amplifying circuit 8.

On the other hand, to the non-inverting input terminal of the operational amplifier of the differential amplifying circuit 8, the current detection result of the current detecting circuit 3 is inputted, and the signal by the comparison is inputted to the inverting input terminal of the PWM comparator 12. The output of the PWM comparator 12 is inputted to the power MOS drive circuit 11, and the duty ratio of the switching element Q1 is changed in response to the input signal. Thus, the high-pressure discharge lamp 6 is constant power controlled.

Further, a circuit is connected to the inverting input terminal of the PWM comparator 12, predetermined time before the polarity inversion, the circuit transmits a signal for increasing the voltage to the switching element Q1, while the circuit transmits a signal for stopping the signal for increasing the voltage. The operation for raising the voltage of the DC/DC converter circuit during polarity inversion will be described by using the waveform diagram shown in FIG. 11.

Figure 11:
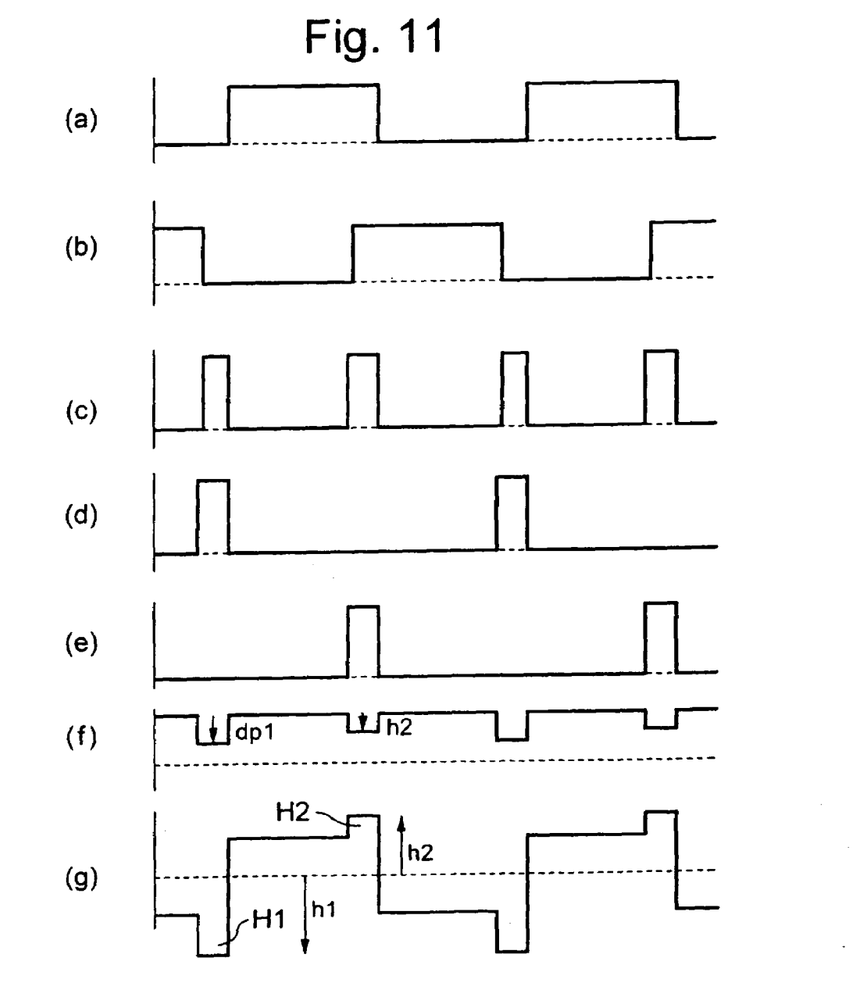
FIG. 11 is a waveform diagram for explaining an operation of the lighting device according to the third embodiment of the present invention shown in FIG. 10.

A rectangular wave ((a) in FIG. 11) outputted from the rectangular low frequency generating circuit 18 and a rectangular wave ((b) in FIG. 11) generated from the delay circuit 26 showing the same waveform as the output of the rectangular low frequency generating circuit 18 and delayed for a predetermined time are EX-NORed, that is, inversion exclusive ORed in the logical circuit 37 to obtain a pulse-like output waveform ((c) in FIG. 11).

The pulse-like output waveform shown in FIG. 11(c) is inputted to the flip-flop circuit 38 through the switch SW3. The waveform shown in FIG. 11(d) is outputted to the Q1 output terminal of the flip-flop circuit 38, and the waveform shown in FIG. 11(e) is outputted to the Q2 terminal. As shown in the waveform diagram of FIG. 11, the pulse of the output of the logical circuit 37 is sorted by the flip-flop circuit 38.

If the output (d) of the flip-flop circuit Q1 is a low level, the transistor TR1 is in an OFF state, and when the output (d) is a high level, this transistor TR1 is in an ON state, and the inverting input terminal of the PWM comparator 12 becomes a voltage division potential of the resistor R8 and the resistor R9. If the output (e) of the flip-flop circuit Q2 is a low level, the transistor TR2 is in an OFF state, and when the output (e) is a high level, this transistor TR2 becomes the ON state, and the inverting input terminal of the PWM comparator 12 becomes a voltage division potential of the resistor R8, the resistor R9 and the resistor R13.

Therefore, to the inverting input terminal of the PWM comparator 12, waveforms having cutouts dp1, dp2 of different depths are alternately inputted as shown in FIG. 11(f). These waveforms are inputted to the power MOS drive circuit 11 as a change of the duty ratio from the PWM comparator 12.

Therefore, the lamp current of the high-pressure discharge lamp becomes a waveform shown in FIG. 11(g). This lamp current waveform has superposing pulses H1, H2 at rear ends, and the amplitudes h1, h2 of these pulses are different and alternately appear.

Since the radiation of heat of a single-ended mold high-pressure discharge lamp varies between the both ends, it is difficult to equalize the temperature of the electrode. As a result, an electrode at high temperature side is easily melt, and an electrode at low temperature side easily causes sputtering.

Then, the lamp current flows to the high-pressure discharge lamp 30 so that the large superposing pulse H1 shown in FIG. 11(g) is applied to the electrode 35b shown in FIG. 9. Thus, the discharge can be performed so as to apply the voltages of the same degree to both the electrodes of the single-ended mold high-pressure discharge lamp 30.

The depths dp1, dp2 of the cutouts of the waveform applied to the FIG. 11(f) are decided depending upon the voltage dividing ratio of the values of the resistor R8 and the resistor R9 shown in FIG. 10, and the voltage dividing ratio of the total value of the value of the resistor R8 and the values of the resistor R9 and the resistor R13 shown in FIG. 10, the depths dp1, dp2 of the cutout can be set to suitable values by regulating the value of the resistor R13.

In this embodiment, since the polarity inversion is performed after the lamp current is superposed and the electrodes are heated immediately before the polarity inversion, occurrence of flicker can be prevented even in the discharge lamp using a relatively thick electrode like the high-pressure discharge lamp for the headlight of the automobile in which a large power is applied at the initial time of lighting.

Figure 13:
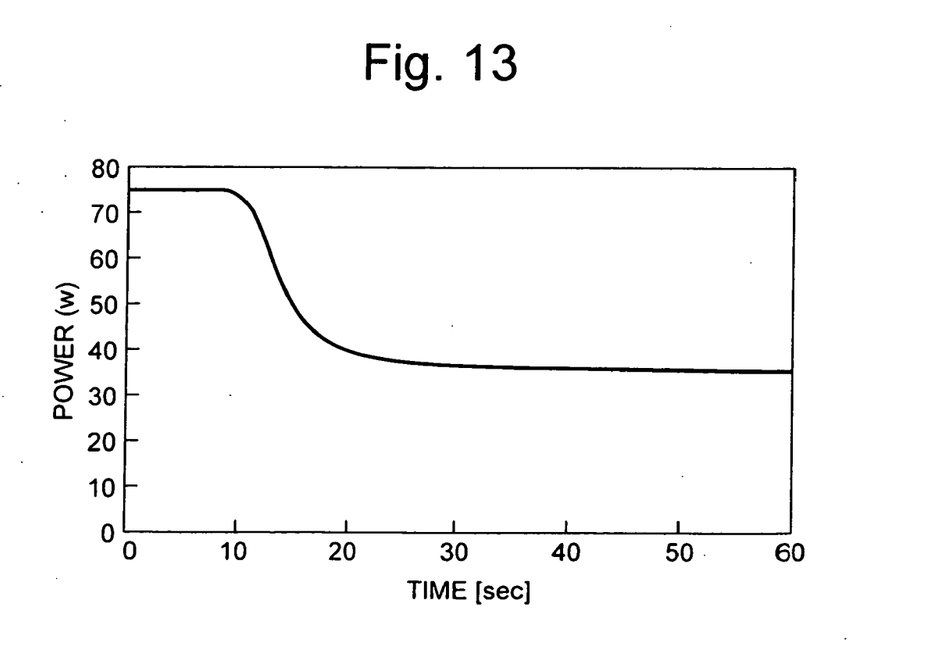
FIG. 13 is a view showing characteristics of applied power in the high-pressure discharge lamp which does not contain mercury for an automobile headlight.

Furthermore, in case of the headlight of the automobile which early rises a luminous flux by applying a larger power than the rated power at the initial time of lighting, as the relationship between the lighting time and the applying power shown in FIG. 13, for example, the headlight having the maximum power of 75 W and the rated power of 35 W is in practical use. However, if the maximum power at the lamp current superposing time is 75 W or less, it is not necessary to increase the resistance of element, etc. That is, the occurrence of flicker in the high-pressure discharge lamp can be prevented without increasing the cost and the size of the lighting device.

Meanwhile, in the above-mentioned embodiments, the amplitude of the pulse superposed on the lamp current applied to the single-ended mold high-pressure discharge lamp 30 is changed to be high at the current supplied to the electrode 35a remote from the base 31, and to be low at the current supplied to the electrode 35b near the base 31.

Figure 12:
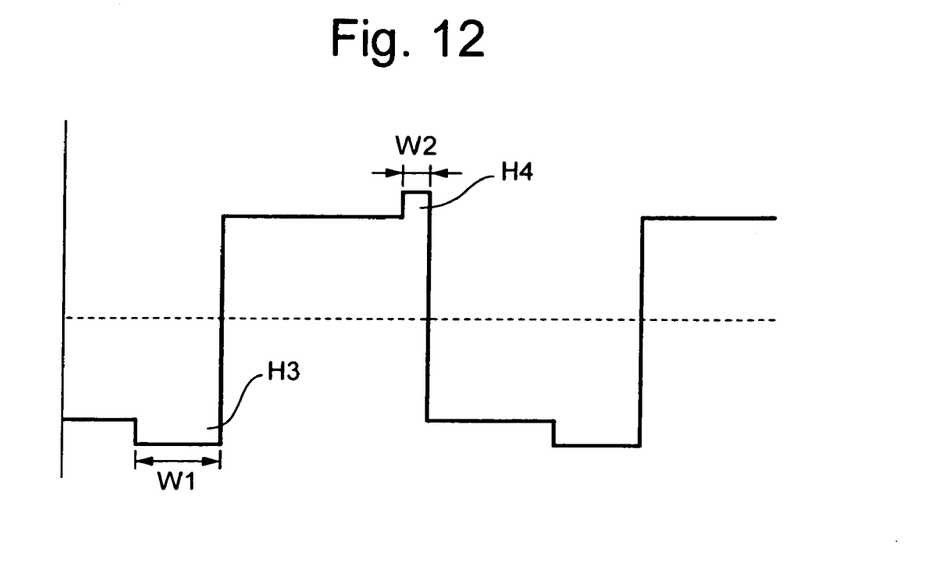
FIG. 12 is a waveform diagram for explaining still another embodiment of the present invention.

However, the present invention does not change the amplitude of the pulse to be superposed, but can change the width of the pulse. FIG. 12 shows the case of this embodiment which shows the current waveform applied to the electrode of the single-ended mold high-pressure discharge lamp 30. In this example, the width w1 of the pulse H3 superposed on the current applied to the electrode 35a remote from the base is wider than the width w2 of the pulse H4 superposed on the current applied to the electrode 35b near to the base. In order to change the width of the pulse superposed in this manner, in the circuit shown in FIG. 11, the width of the pulse outputted from the flip-flop circuit 38 is changed.

In this manner, the discharge by the electrode 35a and the discharge by the electrode 35b can be equivalently performed. Hence the lifetime of the high-pressure discharge lamp 30 can be lengthened.

As described above, before the one current direction is ended and switched to the other, the switch SW1 is closed to increase the output current, and after a predetermined time, the polarity inverting operation is performed, and at the time of ending the polarity inversion, the switch SW1 is opened. At the polarity inverting time of another direction, the switch SW2 is closed, and after a predetermined time, the polarity inverting operation is performed, and at the time of ending the polarity inversion, the switch SW2 is opened. Thus, the height (quantity) of the pulse current to be superposed, as shown in FIG. 11(g), can generate the different waveforms at the respective polarities.

On the other hand, to change the amount of the superposition in terms of time, a time when the switch SW1 is closed and the time when the switch SW2 is closed are made asymmetric, and thereby the waveform shown in FIG. 12 can be generated.

Incidentally, in this case, the switch SW1 can be used as the switch SW2. For example, a change in terms of time can be incorporated with, for example, the port of the microcomputer, etc.

Incidentally, both the height and the width of the pulse applied to the current applied to the discharge lamp are made asymmetric, and the discharges from the electrodes 35a, 35b can be made uniform. Further, when the height of the lamp current is not desired to be changed, the width of the superposed pulse can be changed, and when the frequency of the lamp current is not desired to be changed, the height of the superposed pulse is changed, and so on. The present invention can be executed by suitable combinations.

What is claimed is:

1. A lighting device for a high-pressure discharge lamp, comprising:

a DC/DC converter circuit including a switching element and a drive circuit configured to drive the switching element, wherein a duty cycle of the switching element controls a DC voltage produced by the DC/DC converter circuit;

a DC/AC inverter circuit coupled the DC/DC converter circuit, the DC/AC inverter circuit including a plurality of switching elements; and a logic circuit connected to the drive circuit of the DC/DC converter circuit, wherein prior to a current of the high-pressure discharge lamp reversing polarity, the logic circuit causes the drive circuit to adjust the duty cycle of the switching element so that when the polarity of the current of the high-pressure discharge lamp lit is reversed, an output voltage of the DC/DC converter circuit is 1.5 times or more larger than a voltage of the DC/DC converter circuit at a stable lighting time of the high-pressure discharge lamp.

2. The lighting device for high-pressure discharge lamp according to claim 1, wherein immediately before or after the polarity reversal of the switching elements of the DC/AC inverter circuit, the logic circuit sends a signal for increasing the output voltage of the DC/DC converter circuit to the DC/DC converter circuit, and at the time of zero crossing of the current of the high-pressure discharge lamp, the logic circuit sends a signal for stopping an increase of the output voltage of the DC/DC converter circuit to the DC/DC converter circuit.

3. A lighting device for high-pressure discharge lamp comprising:

a DC power source;

a DC/DC converter circuit coupled to the DC power source and including a switching element, the DC/DC converter lowering or raising a DC output voltage by changing a duty cycle of the switching element;

a capacitor for smoothing the lowered or raised output voltage;

a DC/AC inverter circuit coupled to the capacitor and having a plurality of switching elements, the DC/DC inverter configured to convert a DC power from the capacitor into an AC power by turning on or off a plurality of switching elements;

an igniter connected to an output side of the DC/AC inverter circuit, the igniter having a pulse transformer for generating a high voltage pulse, the igniter being adapted to be controlled by the output voltage of the DC/DC converter circuit;

a high-pressure discharge lamp adapted to be lit by the AC power by the igniter after the high-voltage pulse is applied; and a control for controlling the plurality of switching elements of the DC/AC inverter, wherein the plurality of switching elements of the DC/AC inverter circuit include a first switch and a second switch connected in series and a third switch and a fourth switch connected in series, the third and fourth switches being connected in parallel with the first and second switches and in parallel with the capacitor, wherein an electrode of the discharge lamp is connected via the pulse transformer to a point between the first and second switches and another electrode of the discharge of the lamp is connected to a point between the third and fourth switches, wherein the controller is configured to perform a first control of a voltage of a first polarity to turn ON the second and third switches and turn OFF the first and fourth switches so that current flows from the DC/DC converter and from the capacitor in a first direction through the third switch, the discharge lamp, the pulse transformer and the second switch, wherein the controller is further configured to perform a second control to turn OFF the third switches and turn ON the second and fourth switches or vice-versa, so that current flows in a first loop through the second switch, the fourth switch, the discharge lamp and the pulse transformer or alternatively in a second loop through the first switch, the third switch, the discharge lamp and the pulse transformer, and the current from the DC/DC converter flows through the capacitor and not through the discharge lamps that voltage across the capacitor increases to 1.5 times or more of a voltage of the DC/DC converter circuit at a stable lighting time of the high-pressure discharge lamp, and wherein the controller is further configured to perform a third control of a voltage of a second polarity to turn ON the first one fourth switches and turn OFF the second and third switches so that current flows from the DC/DC converter and from the capacitor in a second direction reverse to the first direction through the first switch, the pulse transformer, the discharge lamp and the fourth switch.

4. A lighting device for high-pressure discharge lamp, comprising:

a DC/DC converter circuit including a switching element and a drive circuit configured to drive the switching element, wherein a duty cycle of the switching element controls a DC voltage produced by the DC/DC converter circuit;

a DC/AC inverter circuit coupled to the DC/DC convener circuit, the DC/AC inverter circuit including a plurality of switching elements; and logic circuit connected to the drive of the DC/DC converter circuit, wherein prior to a current of the pressure lamp reversing polarity, the logic circuit causes the drive circuit to adjust the duty cycle of the switching element so that when the polarity of the current of the high-pressure discharge lamp lit is reversed, an output voltage of the DC/DC converter circuit is 1.5 times or more larger than a voltage of the DC/DC converter circuit at a stable lighting time of the high-pressure discharge lamp, and wherein the DC/DC converter produces a predetermined number of current pulses during each half period of the AC lamp current and the current pulses are superimposed on the AC lamp current, the polarity of the current pulses during each half period is the same polarity of the AC lamp current during that half period, and an amount of the current pulses superposed on the AC lamp current during alternate half periods of the AC lamp current is different so that a pair of the electrodes of the lamp have substantially the same temperature.

5. The lighting device for high-pressure discharge lamp according to claim 4, wherein different amounts of the current pulses is different amplitudes of the current pulses.

6. The lighting device for high-pressure discharge lamp according to claim 4, wherein the different amounts of the current pulses is different widths of the current pulses.

7. The lighting device for high-pressure discharge lamp according to claim 4, wherein the different amounts of the current pulses is different amplitudes and widths of the current pulses.

* * * * *